United States Patent Office 3,554,988
Patented Jan. 12, 1971

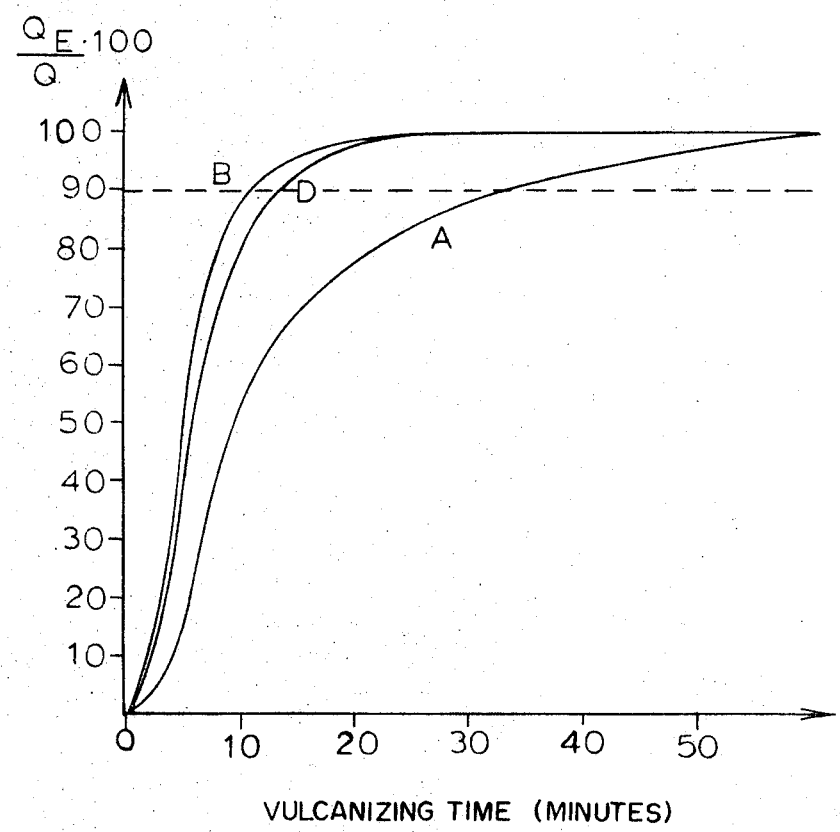

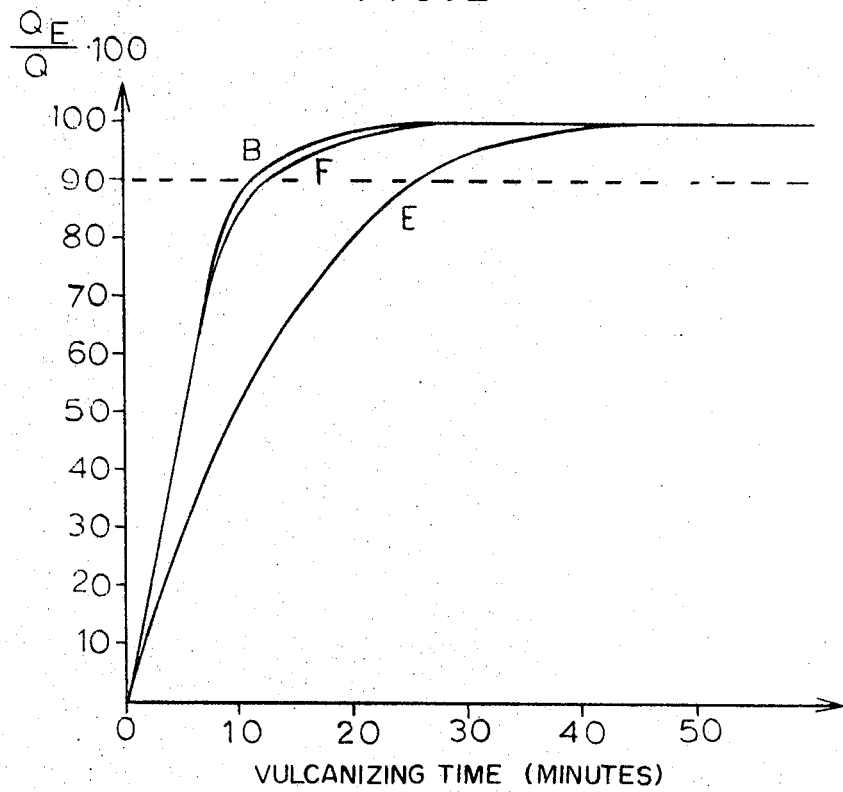

3,554,988
VULCANIZABLE UNSATURATED QUATERPOLYMERS
Hans Emde, Gunter Kerrutt, Heinrich Weber, and Harald Blumel, Marl, Germany, assignors to Chemische Werke Huels A.G., Marl, Germany
Filed Aug. 7, 1967, Ser. No. 658,779
Claims priority, application Germany, Aug. 18, 1966, C 39,903, C 39,904
Int. Cl. C08f 15/40
U.S. Cl. 260—79.5   13 Claims

ABSTRACT OF THE DISCLOSURE

Rapidly vulcanizable unsaturated quaterpolymers of two 1-olefins, an alkylidene or alkenyl norbornene and either hexadiene-1,4 or dicyclopentadiene are prepared with catalysts formed by mixing particular compounds of elements in Main Groups I to III of the Periodic Table with compounds of elements of Subgroups IV to VI of the Periodic Table.

---

Applicants hereby claim the benefit of the filing date of German patent applications C 39,903 IVd/39c and C 39,904 IVd/39c, both of Aug. 18, 1966, pursuant to the provisions of 35 U.S.C. 119.

The present invention relates to vulcanizable unsaturated quaterpolymers and to a catalytic method of preparing same. The monomers are 1-olefins and unconjugated diolefins. The catalyst is a mixed catalyst formed from a compound of a metal of Main Groups I to III of Mendelejeff's Periodic Table and containing at least one hydrogen atom, alkyl group or aryl group bound to the metal atom and a compound of an element of Subgroups IV to VI of said Periodic Table.

Said monomers comprise (a) two 1-olefins having from 2 to 4 carbon atoms, e.g. ethylene, propylene and 1-butene, (b) hexadiene-(1,4), the 3- and 4-monoalkyl derivatives thereof, e.g. 3-methylhexadiene-(1,4), 4-methylhexadiene-(1,4) and 3-ethylhexadiene-(1,4), mixtures of the foregoing, or dicyclopentadiene and (c) a lower alkylidene norbornene, such as methylidene and ethylidene norbornene, or an alkenyl norbornene having from two to eight carbon atoms in the alkylene group, e.g. 5-propen-(1')-yl-norbornene and 5-(3'-methylbutene-(2')-yl)-norbornene.

In the drawings FIGS. 1 and 2 graphically illustrate the vulcanization rates of separate embodiments of the invention as compared with those of terpolymers which lack one of the essential monomers of said invention.

The preparation in hydrocarbons and with mixed catalysts of sulfur-vulcanizable copolymers from 1-olefins, e.g. from ethylene and propylene, and an unconjugated diolefin is known. In such processes the diolefin is employed in an amount just sufficient to provide the required double bonds for vulcanization. The resultant elastomeric copolymers are distinguished over natural rubber and the usual synthetic rubbers by an increased resistance to both aging and ozone and have fewer double bonds in the polymer molecule than any other type of rubber. The vulcanization rate of such copolymerizates, however, depends (notwithstanding the same number of double bonds) very much on the type of the diolefin employed. Thus, a terpolymer of ethylene, propylene and dicyclopentadiene has a low vulcanizing rate, whereas hexadiene-(1,4), for example, yields (with ethylene and propylene) terpolymers having a higher rate of vulcanization. The fastest rate of vulcanization is exhibited by ethylene-propylene rubbers produued with alkenyl norbornenes, such as 5-butene-(2')-yl-, 5-propenyl-(1')-, and 5-(2'-methylbutene-(2')-yl)-norbornene.

These alkenyl as well as alkylidene norbornenes are produced by diene synthesis from cyclopentadiene and suitable diolefins. This synthesis is difficult to conduct, particularly on a large scale, and does not proceed very selectively. The resultant reaction products must therefore be purified by a relatively expensive distillation process. Thus, they are very costly, considerably more so than dicyclopentadiene, for example.

It is, therefore, an object of this invention to produce quaterpolymers exhibiting substantially the same desired rapid rate of vulcanization as terpolymers produced with the alkenyl and/or alkylidene norbornenes, but employing as small an amount as possible of these expensive compounds.

According to this invention it is possible to produce, in an advantageous and surprising manner, rapidly vulcanizable unsaturated quaterpolymers from 1-olefins and unconjugated diolefins in the presence of mixed catalysts, formed from (a) a compound of a metal of Main Groups I to III of the Periodic Table containing at least one hydrogen atom, lower alkyl group, e.g. methyl, aryl group, e.g. phenyl lower alkaryl group, e.g. tolyl, or a (lower) alkyl group, e.g. benzyl, bound to the metal atom and (b) a compound of an element of Subgroups IV to VI of the Periodic Table, by copolymerizing (A) two 1-olefins having from 2 to 4 carbon atoms, e.g. ethylene, (B) hexadiene-(1,4), a 3- or 4-mono(lower)alkyl derivative thereof, a mixture of the foregoing, or dicyclopentadiene and (C) lower alkylidene norbornene, e.g. methylidene norbornene, or alkenyl norbornene, the alkenyl having from 2 to 8 carbon atoms, as well as a centrally positioned, or a terminally positioned branched double bond, e.g. 5 -propene-(1')-yl-norbornene, the molar ratio of (B) to (C) being 1:5 to 5:1, preferably 1:3 to 3:1.

Examplary mono(lower)alkyl derivatives of hexadiene-(1,4) are 3-methylhexadiene-(1,4), 4-methylhexadiene-(1,4) and 3-ethylhexadiene-(1,4).

Preferred alkenyl norbornenes are, for example, 5-propenyl-norbornene, cis- and trans-5-butene-(2')-yl-norbornene, 5-(2'-methylbutene-(2')-yl)-norbornene, and 5-(3'-methylbutene-(2')-yl)-norbornene; a preferred alkylalkenyl norbornene is, for example, 5-methyl-6-propene-(1')-yl-norbornene. Suitable lower alkylidene norbornenes are, for example, methylene norbornene, and ethylidene norbornene.

The molar ratio of the monomers employed is dependent upon the desired composition of the quaterpolymers and is dependent, inter alia, on the type and reactivity of the monomer. The molar ratio range of one 1-olefin: the other 1-olefin:(B):(C) is 100 to 200:80 to 200:1:0.2 to 5, or expressed in another way, the molar ratio of 1-olefins:(B):(C) is 80 to 200:1:0.2–5. The polymers have an average molecular weight range of from 20,000 to 800,000, and in the final polymer the mol ratio of monomers is 20 to 80:80 to 20:1:0.2 to 5.

|  | Mol ratio | | | | C=C. | | Percent |
|---|---|---|---|---|---|---|---|
|  | Ethylene | Propylene | B | C | 1,000 c. | RSV | gel |
| General | 20–80 | 80–20 | 0.2–1.0 | 0.2–1.0 | 3–30 | 1.0–4.0 | <2 |
| Preferred | 40–60 | 60–40 | 0.2–0.4 | 0.2–0.4 | 3–12 | 1.3–2.5 | <2 |

Suitable mixed catalysts are made up of compounds of metals of Main Groups I to III of the Periodic Table, containing at least one hydrogen atom, lower alkyl group, or aryl group bound to the metal atom, and compounds of elements of Subgroups IV to VI of the Periodic Table, preferably those of vanadium.

Suitable compounds of metals of Main Groups I to III of the Periodic Table which contain at least one hydrogen atom, lower alkyl group, aryl group, lower alkaryl group or a (lower)alkyl group bound to the metal atom are, for example, amyl sodium, butyl lithium, diethyl zinc and in particular, aluminum compounds, such as, trialkyl, triaryl, and triaralkyl aluminum compounds, e.g. trimethyl aluminum, triethyl aluminum, triisobutyl aluminum, triphenyl aluminum, tri(ethylphenyl) aluminum and tribenzyl aluminum, as well as mixtures thereof with one another. Furthermore, di(lower)alkyl aluminum monohalogenides, such as diethyl aluminum monochloride or diethyl aluminum monobromide, and the monoalkyl aluminum dihalogenides, such as ethyl aluminuum dichloride or ethyl aluminum dibromide are suitable. Mixtures of equimolar quantities of di(lower)alkyl aluminum monochlorides and lower alkyl aluminum dichlorides, called lower alkyl aluminum sesquichloride, such as ethyl aluminum sesquichloride, are preferred. Lower alkyl aluminum hydrides, such as diethyl aluminum monohydride and diisobutyl aluminum monohydride, can also be used.

Suitable compounds of Subgroups IV to VI of the Periodic Table are, particularly, vanadium tetrachloride and vanadium oxytrichloride, as well as vanadium esters, such as vanadium triacetate $V(OOCCH_3)_3$ and vanadium triacetylacetonate $V(C_5H_7O_2)_3$.

The copolymerization can be conducted in the liquefied monomers, if desired, under pressure. However, advantageously, the polymerization is effected in inert solvent, for example, in a hydrocarbon which is liquid under the reaction conditions, such as butane, pentane, hexane, cyclohexane, isopropyl cyclohexane, gasoline fractions, such as petroleum ether, benzene, toluene and xylene, a hydrocarbon mixture which is liquid under the reaction conditions, or chlorinated hydrocarbon, such as tetrachloroethylene, chlorobenzene and mixtures thereof.

Mixtures of aliphatic, e.g. alkyl, and cycloaliphatic, e.g. cycloalkyl, hydrocarbons, for example, of hexane and isopropyl cyclohexane, are particularly suitable.

The copolymerization is especially smooth with mixed catalysts dissolved or colloidally distributed in the inert solvent employed in the process. Reaction products obtainable by reacting a vanadium compound, such as vanadium tetrachloride, vanadium oxytrichloride and vanadium esters, e.g. vanadium triacetate, with an organo-metallic compound of aluminum, such as triethyl aluminum, triisobutyl aluminum, trihexyl aluminum, diethyl aluminum monochloride, and ethyl aluminum sesquichloride, in an inert diluent, are preferred.

The copolymerization occurs within a wide temperature range, advantageously between −30° and +60° C. The reaction is generally conducted at atmospheric pressure, but it can also be conducted under elevated pressures, e.g. up to about 25 atmospheres.

The polymerization, which is preferably conducted continuously, is terminated in a conventional manner by adding thereto a substance having active hydrogen, such as water, alcohol, e.g. ethanol and methanol, or carboxylic acid, e.g. acetic acid.

The quaterpolymers produced in accordance with this invention are readily vulcanizable with the aid of sulfur, a recipe being employed which additionally contains zinc oxide and tetramethylthiuram disulfide. Fillers, such as carbon black and naphthenic oils, can be admixed in amounts conventionally used for other types of rubber.

It is known that mixtures of slowly vulcanizing terpolymers of ethylene, propylene and dicyclopentadiene, as well as rapidly vulcanizing terpolymers of ethylene, propylene and alkenyl or alkylidene norbornene, do not exhibit an increase in the rate of vulcanization with respect to the more slowly vulcanizing components. It is, in any case, surprising and unexpected that quaterpolymers possess an elevated rate of vulcanization in comparison to the more slowly vulcanizable terpolymer. Rather, it was to be expected that the molecule portions containing the rapdily vulcanizable diene, e.g. the alkenyl norbornene, would vulcanize prior to those portions carrying the less rapidly vulcanizable diene, e.g. dicyclopentadiene. Thus, a non-uniform, stepwise and lagging vulcanization process would have been expected. However, the quaterpolymers of the present invention vulcanize considerably more rapidly than would be expected from the proportion of the more slowly vulcanizable dicyclopentadiene component.

Thus, the dicyclopentadiene content does not have an adverse effect upon the vulcanization rate, yet has a beneficial effect upon the cross-linking density of the vulcanizates. This density is considerably higher than in case of alkenyl norbornene terpolymers and is only negligibly lower than in dicyclopentadiene terpolymers. Thus, the rate of vulcanization of the quaterpolymers of this invention is determined by the proportion of alkenyl norbornene, and the degree of cross-linking is determined by the proportion of dicyclopentadiene.

Vulcanizates of polymers of this invention can be used as synthetic rubber for such applications as automobile tires and in other areas where rubber is normally employed.

The process will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Ethylene, propylene, 5-cis-butene-(2')-yl-norbornene, and dicyclopentadiene are continuously copolymerized at 30° C. with vanadium oxytrichloride and ethyl aluminum sesquichloride. In four hours, there are employed 6 millimols (=1.042 g.) of vanadium oxytrichloride and 72 millimols (=8.90 g.) of ethyl aluminum sesquichloride, each of these compounds being dissolved in one liter of dry hexane. The two diolefins, namely 4.75 g. of 5-cis-butene-(2')-yl-norbornene and 4.22 g. of dicyclopentadiene, are dissolved together in 2.5 liters of hexane.

These several hexane solutions are then added dropwise, in the course of four hours, into a reaction vessel which was initially charged with 1.5 liters of hexane initially saturated at room temperature (about 20° C.) with a 1:2 molar mixture of ethylene and propylene by introducing same at such proportions into same for ½ hour. The reaction mixtuer is agitated and simultaneously ethylene and propylene are introduced into the reaction vessel at a rate of 1 mol of gaseous ethylene and 1.5 mols of gaseous propylene per hour. The molar ratio of ethylene:propylene:5-cis-butene-(2')-yl-norbornene:dicyclopentadiene is 1:1.5:0.008:0.008.

The polymeric solution thus prepared is continuously conducted into a second reaction vessel wherien it is maintained under agitation and the polymerization is stopped by the dropwise addition thereto of 200 milliliters of butanol (over a period of 3½ hours) to which 1.5 ml. of 2,2'-methylene-bis-6-tert.-butyl-4-methylphenol as a stablizer have been added. The resulting solution is passed into a third reaction vessel wherein it is washed with water. After phase separation, the hexane solution is mixed with 1.5 to 2 liters of acetone; the precipitated quaterpolymer is agitated with acetone overnight (about 17 hours), and thereafter dried under vacuum at 50° C.

There are thus obtained 191 g. of colorless, elastomeric polymerizate. The reduced specific voscosity (RSV) is measuerd in a 0.1% p-xylene solution at 110° C. and amounts to 1.47; the Mooney viscosity ML–4 is 75. The gel content is below 2% by weight based on the total weight of the polymer. The iodine number is 7.2, corresponding to 4.0 double bonds per 1000 carbon atoms. Infrared analysis indicates a propylene content of 53% by weight, and a dicyclopentadiene content of 2.1 C=C/1000. c., corresponding to 52.0% of the entire unsaturation. The vulcanizing ingredients are mixed within 12 minutes into the polymer on a roll-mixer rotating 12 times a minute.

The comparable polymers listed in Table 1 under A to D are vulcanized at 150° to 160° C. with the use of the following recipe:

| | Parts by weight |
|---|---|
| Quaterpolymer | 100 |
| Zinc oxide | 5 |
| Sulfur | 1.5 |
| Tetramethylthiuram disulfide | 1.5 |

Each of the mixtures produced with the polymers A to D is vulcanized in a press at 160° C., there being produced vulcanizates at 8 different heating times within the range of 5 to 120 minutes, in order to encompass the entire cross-linking procedure. The degree of cross-linking of the thus-obtained vulcanized products is then determined by swelling measurements. Accurately weighed 1 mm. thick samples are swelled for 48 hours at 23° C. in excess p-xylene. The thus-swelled samples and the samples dried after the swelling agent has been removed are likewise weighed. The measured equilibrium swelling Q is defined as the weight ratio of the swelling agent absorbed by the polymer to the dry polymerizate in the polymer swelled to equilibrium. The reciprocal equilibrium swelling $1/Q$ is plotted as the measure of cross-linking with respect to the vulcanization period. The resulting cross-linking curves are suitable for determining the respective vulcanizing rate. As a measure for the vulcanization rate, the $t_{90}$-values are employed—as is generally conventional—i.e., the vulcanization periods necessary for attaining 90% of the final degree of cross-linking.

It can be seen from Table 1 that the ethylene-propylene-dicyclopentadiene terpolymer (A), vulcanizes very slowly, with $t_{90}=35$ minutes. A relatively high rate of vulcanization is attained, however, by polymer (B) containing, in place of dicyclopentadiene, 5-cis-butene-(2')-yl-norbornene as the ter-component. If the polymers A and B are mixed, at a 1:1 ratio, on a roll mill, a $t_{90}$-value of 31 minutes results for the blend, thus coming close to that of the slowly vulcanizing polymer A. In contradistinction thereto, if the quaterpolymer D is vulcanized, which is produced according to the process of this invention (see Example 1) and the dicyclopentadiene proportion of which, as per the IR-analysis, amounts to 52% of the unsaturated proportion, there is observed the surprisingly low $t_{90}$-value of 13 minutes, i.e. this polymer vulcanizes almost as fast as if it contained only 5-cis-butene-(2')-yl-norbornene as the vulcanization-active component.

The course of vulcanization is graphically illustrated in FIG. 1 for mixtures A, B and D. Plotting the values of the reciprocal equilibrium swelling $1/Q$, determined for the individual vulcanizing periods, against the vulcanization period results in the final value of the reciprocal equilibrium swelling $1/Q_E$. If the $1/Q$-values are related to this final value, i.e. if the quotient $1/Q:1/Q_E$ is formed, the relative swelling values $Q_E/Q$ are obtained. By plotting these values against the vulcanizing period, the $t_{90}$-values can be read off directly, and it can further- more be seen after which vulcanization period the final value of cross-linking is obtained.

TABLE 1.—FOR EXAMPLE 1

| Polymerizate | RSV | C=C. 1,000 c. | $t_{90}$ at 160° C. in minutes | (1/Q) max. |
|---|---|---|---|---|
| A. Ethylene, propylene, dicyclopentadiene | 1.2 | 4.2 | 35 | 0.34 |
| B. Ethylene, propylene, 5-cis-butene-(2')-yl-norbornene | 1.25 | 3.5 | 11 | 0.28 |
| C. 1:1 blend of A and B | 1.22 | 3.9 | 31 | 0.30 |
| D. Ethylene, propylene, dicyclopentadiene 5-(cis-butene-(2')-yl)-norbornene | 1.47 | 4.0 | 13 | 0.31 |

Replacing the 5-cis-buten-(2')-yl-norbornene with an equivalent of 5-propen-(1')-yl-norbornene results in the preparation of a polymer, in similar manner, with comparable properties.

EXAMPLE 2

The production of a quaterpolymer analogously to Example 1, of ethylene, propylene, 5-cis-buten-(2')-yl-norbornene and dicyclopentadiene in a molar ratio of 1:1.5:0.008:0.008 results in a yield of 520 g. in a continuous polymerization for 12 hours; RSV=1.82; 47% by weight of propylene, and 53% dicyclopentadiene unsaturation. The molecular weight range is from 250,000 to 300,000, and the average molecular weight is 270,000.

This quaterpolymer (C) is vulcanized with the use of HAF (high abrasion furnace) carbon black, and the test data are compared with a corresponding dicyclopentadiene terpolymerizate (A) and a 5-cis-buten-(2')-yl-norbornene terpolymerizate (B).

Replacing the 5-cis-buten-(2')-yl-norbornene with an equivalent of 5-(3'-methylbuten-(2')-yl-norbornene results in the preparation, in similar manner, of polymer with comparable properties.

The vulcanization recipe is as follows:

| | Parts by weight |
|---|---|
| A, B, or C | 100 |
| Stearic acid | 1 |
| Zinc oxide | 5 |
| HAF carbon black | 50 |
| Naphthenic oil [1] | 10 |
| Tetramethylthiuram disulfide | 1 |
| 2-Mercaptobenzothiazole | 0.5 |
| Sulfur | 1 |

[1] This naphthenic oil has a viscosity-density-factor of 0.821 to 0.900 and a Sayboldt-viscosity of 85 sec. at 98.9° C. ("Circosol-2XH"; see F. C. Rostler and R. M. White, Ind. Engng. Chem 47, 1069 (1955); W. K. Taft, Ind. Engng. Chem. 47, 1077 (1955)).

From Table 2, it can be seen that A vulcanizes slowly, whereas B and C, though having a low degree of unsaturation, rapidly vulcanize; the modulus values reach a plateau after 30 minutes of heating; in the case of A no plateu is formed.

TABLE 2.—FOR EXAMPLE 2

| Polymerizate | C=C/ 1,000 c. | percent DCP total unsatu- ation | RSV | ML-4 | Wt. percent propyl- ene | Vulcanization data after 120 Minutes at 160° C. | | | | | | | | |
|---|---|---|---|---|---|---|---|---|---|---|---|---|---|---|
| | | | | | | Tensile strength, kg./cm.$^2$ | elonga- tion, percent | Modulus 300% | | | | Permanent elongation | Hardness ° shore | Elasticit |  |
| | | | | | | | | 15 | 30 | 60 | 120 min. | | | 22° | 75° |
| A. Ethylene, propylene, dicyclopentadiene | 5.1 | 100 | 1.80 | 84 | 47 | 222 | 420 | 81 | 122 | 138 | 145 | 16 | 68 | 45 | 47 |
| B. Ethylene, propylene, 5-(cis-buten-(2')-yl)-norbornene | 3.5 | 0 | 1.80 | 80 | 51 | 219 | 397 | 112 | 151 | 152 | 155 | 15 | 66 | 45 | 50 |
| C. Ethylene, propylene, 5-(cis-buten-(2')-yl)-norbornene, dicyclopentadiene | 4.4 | 53 | 1.82 | 80 | 47 | 209 | 460 | 115 | 120 | 121 | 125 | 15 | 60 | 58 | 50 |

EXAMPLE 3

In the polymerizing apparatus described in connection with Example 1, a copolymerizate is produced in an analogous manner, consisting of ethylene, propylene, 5-trans-buten-(2')-yl - norbornene, and dicyclopentadiene. With a molor ratio charged of 1:1.5:0.008:0.008, there are obtained in a continuous process within 4 hours 178 g. of polymerizate. The RSV value is 1.36, the iodine number of 7.4, that is, 4.1 double bonds per 1000 carbon atoms. From the infrared analysis a propylene content of 54% by weight and a dicyclopentadiene content of 1.8 C=C/1000 c. is determined, corresponding to 43.8% of the entire unsaturation. The molecular weight range is from 80,000 to 100,00, and the average molecular weight is 90,000.

The polymers listed in Table 3 are vulcanized at 160° C. as described in Example 1. Also, swelling measurements are conducted on the vulcanizates and the $t_{90}$-values are measured as set forth in Example 1. As compared with the $t_{90}$-value of the terpolymer A containing dicyclopentadiene of 35 minutes, a corresponding terpolymer B containing 5-trans-buten-(2')-yl-norbornene has a $t_{90}$-value of 12 minutes. The quaterpolymer $C_1$, produced according to this invention, of ethyelne, propylene, dicyclopentadiene and 5 - trans-buten-(2')-yl-norbornene with a dicyclopentadiene proportion of 43.8%, based on the entire unsaturation of the polymer, has a similar vulcanizing rate, with the $t_{90}$-value being 15 minutes, as the terpolymer containing exclusively 5-trans-buten-(2')-yl-norbornene, although the former has a substantial proportion of the dicyclopentadiene component, leading to slow vulcanization.

The quaterpolymer $C_2$ produced in accordance with the invention is obtained from ethylene, propylene, 5-trans-buten-(2')-yl-norbornene and dicyclopentadiene in a molar ratio of 1:1:0.008:0.01. This quaterpolymer, while having a higher RSV-value (1.60), exhibits the same rate of vulcanization as the terpolymerizate B containing solely 5-trans-buten-(2')-yl-norbornene. $C_2$ contains 50% by weight of propylene and a dicyclopentadiene unsaturation of 48.8%. The molecular weight range is from 120,000 to 150,000, and the average molecular weight is 135,000.

TABLE 3.—FOR EXAMPLE 3

| Polymerizate | RSV | C=C. 1,000 c. | $t_{90}$ at 160° C. in minutes | (1/Q) max. |
|---|---|---|---|---|
| A. Ethylene, propylene, dicyclopentadiene | 1.2 | 4.2 | 35 | 0.34 |
| B. Ethylene, propylene, 5-(trans-buten-(2')-yl)-norbornene | 1.14 | 4.0 | 12 | 0.27 |
| $C_1$. Ethylene, propylene, dicyclopentadiene, 5-(trans-buten-(2')-yl)-norbornene | 1.36 | 4.2 | 15 | 0.27 |
| $C_2$. Ethylene, propylene, dicyclopentadiene, 5-(trans-buten-(2')-yl)-norbornene | 1.60 | 4.2 | 12 | 0.31 |

EXAMPLE 4

As set forth in Example 1, there are continuously copolymerized at 30° C., in hexane, ethylene, propylene, dicyclopentadiene and 5-(2'-methylbuten - (2') - yl) - norbornene in a molar ratio of 1:1.5:0.008:0.008. A colorless, elastomeric product (195 g.) is obtained, having the RSV-value of 1.36. The total unsaturation, according to the iodine number determination, is 4.1 C=C/1000 c. The infrared analysis yields 57% by weight of propylene and 1.7 cis-positioned double bonds per 1000 carbon atoms, corresponding to 41.4% of the entire unsaturation attributable to the dicyclopentadiene. In Table 4, this quaterpolymer C is compared with the terpolymers A and B. It can be seen that the product C vulcanizes considerably faster than product A and only a little slower than product B. Quaterpolymer C has a molecular weight range of from 120,000 to 150,000, and an average molecular weight of 140,000.

TABLE 4.—FOR EXAMPLE 4

| Polymerizate | RSV | C=C/ 1,000 c. | $t_{90}$ at 160° C. in minutes | (1/Q) max. |
|---|---|---|---|---|
| A. Ethylene, propylene, dicyclopentadiene | 1.2 | 4.2 | 35 | 0.34 |
| B. Ethylene, propylene, 5-(2'methyl-buten-(2')-yl)-norbornene | 1.36 | 4.4 | 11 | 0.265 |
| C. Ethylene, propylene, dicyclopentadiene, 5-(2'-methyl-buten-(2')-yl)-norbornene | 1.36 | 4.1 | 16 | 0.275 |

Replacing the 5-(2'-methylbuten-(2') - yl) - norbornene with an equivalent of 5-methyl-6-propenyl norbornene results in the preparation, in similar manner, of polymer with comparable properties.

EXAMPLE 5

If, as described in Example 1, ethylene, propylene, dicyclopentadiene, and ethylidene norbornene are polymerized at a molar ratio of 1:1.5:0.006:0.006, 191 g. of a quaterpolymer are obtained having an RSV-value of 1.30 and a total unsaturation, determined from the iodine number, of 3.8 double bonds per 1000 carbon atoms. The infrared analysis yields a propylene content of 52% by weight and a dicyclopentadiene content of 1.7 C=C/1000 c., corresponding to 45% of the total unsaturation.

In Table 5, this quaterpolymer C is compared with analogously produced terpolymers containing dicyclopentadiene (sample A) and ethylidene norbornene (sample B), with respect to the vulcanization rate. The $t_{90}$—value of A, B, and C is 35:14:15.

TABLE 5.—FOR EXAMPLE 5

| Polymerizate | RSV | C=C/ 1,000 c. | $t_{90}$ at 160° C. in minutes | (1/Q) max. |
|---|---|---|---|---|
| A. Ethylene, propylene, dicyclopentadiene | 1.20 | 4.2 | 35 | 0.34 |
| B. Ethylene, propylene, ethylidenenorbornene | 1.40 | 3.9 | 14 | 0.28 |
| C. Ethylene, propylene, dicyclopentadiene, ethylidenenorbornene | 1.30 | 3.8 | 15 | 0.32 |

Replacing the ethylidenenorbornene with an equivalent of methylenenorbornene results in the preparation, in similar manner, of polymer with comparable properties.

EXAMPLE 6

Ethylene, propylene, 5-cis-buten-(2')-yl-norbornene and trans-hexadiene-(1,4) are continuously copolymerized at 30° C. with vanadium oxytrichloride and ethyl aluminum sesquichloride, as described in Example 1. The molar ratio of ethylene:propylene:trans-hexadiene-(1,4):5-cis-buten-(2')-yl-norbornene is 1:1.5:0.03:0.007.

The polymer solution thus prepared is conducted into a second reaction vessel wherein it is maintained under agitation and the polymerization process is then terminated by the dropwise addition thereto of 200 milliliters of butanol (over a period of about 3½ hours) to which 1.5 ml. of stabilizer, namely 2,2'-methylene-bis-6-tert.-butyl-4-methylphenol have been added. The resulting solution is conducted into a third reaction vessel wherein the polymer solution is washed with water. After phase separation, the hexane solution is mixed with 1.5 to 2 liters of acetone; the precipitated quaterpolymer is mixed under stirring with acetone overnight, and is then dried under vacuum at 50° C. There are thus obtained 183 g. of a colorless, elastomeric polymerizate. The reduced specific viscosity (RSV) is measured in a 0.1% p-xylene solution at 110° C. and amounts to 1.14; the Mooney viscosity ML-4 is 75. The gel content is below 2% by weight, based on the total weight of the polymer. The iodine number of 6.4, corresponding to 3.6 double bonds per 1000 carbon atoms, was measured. The infrared analysis yields a propylene content of 50% by weight and 1.67 trans-positioned double bonds per 1000 carbon atoms, corresponding to a 46.6% proportion of the total unsaturation is attributable to the trans-hexadiene-(1,4).

In Table 6, this quaterpolymer F is compared with respect to the vulcanization rate with analogously produced terpolymers, containing trans-hexadiene-(1,4) (sample E) and 5-cis-buten-(2')-yl-norbornene (sample B).

The $t_{90}$-values in E, B, and F are in the proportion of 26:11:13 minutes.

TABLE 6.—FOR EXAMPLE 6

| Polymerizate | RSV | C=C/ 1,000 c. | $t_{90}$ at 160° C. in minutes | (1/Q) max. |
|---|---|---|---|---|
| E. Ethylene, propylene, trans-hexadiene-(1,4) | 1.49 | 3.5 | 26 | 0.25 |
| B. Ethylene, propylene, 5-cis-buten-(2')-yl-norbornene | 1.25 | 3.5 | 11 | 0.28 |
| F. Ethylene, propylene, trans-hexadiene-(1,4)-5-(cis-buten-(2')yl)-norbornene | 1.14 | 3.7 | 13 | 0.27 |

The course of the vulcanizing process for mixtures E, B and F is graphically illustrated in FIG. 2. Plotting the values of the reciprocal equilibrium swelling $1/Q$ determined for the individual vulcanizing periods against the vulcanizing period yields the final value of the reciprocal equilibrium swelling $1/Q_E$. If the $1/Q$-values are related to this final value, i.e., if the quotient $1/Q:1/Q_E$ is formed, the relative swelling values $Q_E/Q$ are obtained. From the plotting of these values against the vulcanizing period, the $t_{90}$-values can be directly read off, and it can furthermore be seen after what period of vulcanization the final value of cross-linking is attained.

Similar results are obtained when ethylene, propylene, 3-methylhexadiene-(1,4) and 5-(2'-methylbuten-(2')-yl)-norbornene are polymerized in a molar ratio of 1:1:0.03:0.008).

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. Sulfur-vulcanizable, normally solid, elastomeric copolymer of (A') a 1-olefin having from 2 to 4 carbon atoms, (A") another 1-olefin having from 2 to 4 carbon atoms, (B) a member selected from the group consisting of hexadiene-(1,4), a 3-mono (lower)alkylhexadiene-(1,4), a 4-mono(lower)alkylhexadiene-(1,4), a mixture of at least two of the foregoing, and dicyclopentadiene and (C) a member selected from the group consisting of lower alkylidene norbornene and alkenyl norbornene, the alkenyl of which has from 2 to 8 carbon atoms, the molar ratio of (A'):(A"):(B):(C) being from 20 to 80:80 to 20:1:0.2 to 5.
2. A copolymer according to claim 1 wherein monomer (B) is a member selected from the group consisting of hexadiene-(1,4), a 3-mono(lower alkylhexadiene-(1,4), a 4-mono(lower)alkylhexadiene-(1,4), and a mixture of at least two of the foregoing.
3. A copolymer according to claim 1 wherein monomer (B) is dicyclopentadiene.
4. A copolymer according to claim 1 wherein monomer (C) is a member selected from the group consisting of cis- and trans-5-buten-(2')-yl-norbornene.
5. A copolymer according to claim 1 wherein monomer (C) is 5-(2'-methylbuten-(2')-yl)-norbornene.
6. A copolymer according to claim 2 wherein monomer (B) is hexadiene-(1,4).
7. Sulfur vulcanized vulcanizate of the copolymer of claim 1.
8. Sulfur-vulcanized vulcanizate of the copolymer of claim 2.
9. Sulfur-vulcanized vulcanizate of the copolymer of claim 3.
10. Sulfur-vulcanized vulcanizate of the copolymer of claim 4.
11. Sulfur-vulcanized vulcanizate of the copolymer of claim 5.
12. Sulfur-vulcanized vulcanizate of the copolymer of claim 6.
13. A copolymer as defined by claim 1 having a molecular weight of 20,000 to 800,000.

References Cited

UNITED STATES PATENTS 3,340,240   9/1967   Natta _____ 260—88.2

OTHER REFERENCES

A New Hydrocarbon Elastomer by E. K. Gladding, D. S. Fisher, and J. W. Collette, Rubber Chemistry and Tech., vol. 35, October, 1962, pp. 1114–1125.

JOSEPH L. SCHOFER, Primary Examiner

R. S. BENJAMIN, Assistant Examiner

U.S. Cl. X.R.

260—80.78

UNITED STATES PATENT OFFICE
CERTIFICATE OF CORRECTION

Patent No. 3,554,988      Dated January 12, 1971

Inventor(s) HANS EMDE et al.

It is certified that error appears in the above-identified patent and that said Letters Patent are hereby corrected as shown below:

Column 8, TABLE 2 - FOR EXAMPLE 2, Line 14 under ELASTICIT change "58" to ---48---

Signed and sealed this 1st day of June 1971.

(SEAL)
Attest:

EDWARD M. FLETCHER, JR.  
Attesting Officer

WILLIAM E. SCHUYLER, JR  
Commissioner of Patents